US010563050B2

(12) United States Patent
Isitman et al.

(10) Patent No.: US 10,563,050 B2
(45) Date of Patent: Feb. 18, 2020

(54) PNEUMATIC TIRE

(71) Applicant: The Goodyear Tire & Rubber Company, Akron, OH (US)

(72) Inventors: Nihat Ali Isitman, Ettelbruck (LU); Lucas Manuel Dos Santos Freire, Akron, OH (US); Arindam Mazumdar, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/969,687

(22) Filed: Dec. 15, 2015

(65) Prior Publication Data
US 2017/0166732 A1    Jun. 15, 2017

(51) Int. Cl.
*C08L 9/06* (2006.01)

(52) U.S. Cl.
CPC ............. *C08L 9/06* (2013.01); *C08L 2205/02* (2013.01); *C08L 2205/03* (2013.01); *C08L 2205/06* (2013.01)

(58) Field of Classification Search
CPC ..... C08L 9/06; C08L 9/00; B60C 1/00; B60C 1/0016; C08K 5/0016
USPC ......................................................... 523/156
See application file for complete search history.

(56) References Cited

U.S. PATENT DOCUMENTS

| | | | |
|---|---|---|---|
| 4,487,892 A | 12/1984 | Ohmori et al. | |
| 5,395,891 A | 3/1995 | Obrecht et al. | |
| 5,504,135 A | 4/1996 | Ardrizzi et al. | |
| 5,672,639 A | 9/1997 | Corvasce et al. | |
| 5,877,249 A | 3/1999 | Lambotte | |
| 5,901,766 A | 5/1999 | Sandstrom et al. | |
| 6,103,808 A | 8/2000 | Hashimoto | |
| 6,127,488 A | 10/2000 | Obrecht et al. | |
| 6,133,364 A | 10/2000 | Obrecht et al. | |
| 6,146,520 A | 11/2000 | Gupte et al. | |
| 6,207,757 B1 | 3/2001 | Obrecht et al. | |
| 6,242,534 B1 | 6/2001 | Obrecht et al. | |
| 6,248,929 B1 | 6/2001 | Kaimai et al. | |
| 6,372,857 B1 | 4/2002 | Obrecht et al. | |
| 6,372,863 B1 | 4/2002 | Kerns et al. | |
| 6,399,697 B1 | 6/2002 | Takasaki et al. | |
| 6,410,816 B2 | 6/2002 | Takasaki et al. | |
| 6,608,125 B2 | 8/2003 | Cruse et al. | |
| 7,019,084 B2 * | 3/2006 | Sandstrom ................ C08L 9/00 523/351 |
| 7,259,205 B1 | 8/2007 | Pagliarini et al. | |
| 7,342,070 B2 | 3/2008 | Tsukimawashi et al. | |
| 7,441,572 B2 | 10/2008 | Weydert et al. | |
| 7,671,132 B1 | 3/2010 | Thielen et al. | |
| 7,825,183 B2 | 11/2010 | Robert et al. | |
| 7,834,074 B2 | 11/2010 | Brunelet et al. | |
| 7,882,874 B2 | 2/2011 | Robert et al. | |
| 8,312,905 B2 | 11/2012 | Steiner et al. | |
| 8,459,319 B2 | 6/2013 | Ryba et al. | |
| 8,569,409 B2 | 10/2013 | Thiele et al. | |
| 8,580,867 B2 | 11/2013 | Herzog et al. | |
| 8,637,606 B2 | 1/2014 | Pille-Wolf et al. | |
| 8,697,793 B2 | 4/2014 | Goto | |
| 2001/0007049 A1 | 7/2001 | Takasaki et al. | |
| 2001/0023307 A1 | 9/2001 | Kaimai et al. | |
| 2002/0000280 A1 | 1/2002 | Scholl | |
| 2002/0045697 A1 | 4/2002 | Sohnen et al. | |
| 2003/0130535 A1 | 7/2003 | Deschler et al. | |
| 2005/0197442 A1 | 9/2005 | Jones et al. | |
| 2006/0041063 A1 | 2/2006 | Cruse et al. | |
| 2010/0186869 A1 | 7/2010 | Sandstrom et al. | |
| 2010/0204358 A1 | 8/2010 | Lopitaux | |
| 2011/0152405 A1 | 6/2011 | Thomasson | |
| 2011/0160337 A1* | 6/2011 | Ishino ................... B60C 1/0016 523/157 |
| 2011/0184084 A1* | 7/2011 | Katou ................... B60C 1/0016 523/156 |
| 2011/0263750 A1 | 10/2011 | Lopitaux et al. | |
| 2012/0016056 A1* | 1/2012 | Miyazaki ................. C08L 9/06 523/156 |
| 2012/0024441 A1 | 2/2012 | Ryba et al. | |
| 2012/0041098 A1* | 2/2012 | Lopitaux ............... B60C 1/0016 523/156 |

(Continued)

FOREIGN PATENT DOCUMENTS

| | | |
|---|---|---|
| EP | 0839891 B1 | 6/2004 |
| EP | 2455232 B1 | 8/2013 |
| ES | 2122917 | 7/1999 |
| JP | 2002097369 | 4/2002 |
| WO | WO2007047943 A2 | 4/2007 |
| WO | 2013039498 A1 | 3/2013 |
| WO | 2015124679 A1 | 8/2015 |

OTHER PUBLICATIONS

European Search Report dated Apr. 13, 2017 for Application Serial No. EP16202738.

*Primary Examiner* — Doris L Lee

(74) *Attorney, Agent, or Firm* — John D. DeLong

(57) ABSTRACT

The present invention is directed to a pneumatic tire having a tread comprising a vulcanizable rubber composition comprising, based on 100 parts by weight of elastomer (phr), (A) from about 60 to about 100 phr of a solution polymerized styrene-butadiene rubber having more than 98 percent of the repeat units derived from styrene in blocks containing less than five repeat units, Tg ranging from −65° C. to −79° C.;

(B) up to 40 phr of polybutadiene having a cis 1,4 content greater than 95 percent and a Tg ranging from −80 to −110° C.;

(C) from 30 to 80 phr of a combination of a resin having a Tg of at least 30° C. and an oil, wherein the weight ratio of resin to oil is greater than 1.

9 Claims, No Drawings

(56) References Cited

U.S. PATENT DOCUMENTS

| | | |
|---|---|---|
| 2012/0077902 A1 | 3/2012 | Steiner et al. |
| 2012/0123018 A1 | 5/2012 | Kanz et al. |
| 2012/0138203 A1 | 6/2012 | Kaes et al. |
| 2012/0157568 A1 | 6/2012 | Sandstrom et al. |
| 2012/0208919 A1 | 8/2012 | Kanz et al. |
| 2012/0285599 A1 | 11/2012 | Miyazaki |
| 2013/0096248 A1 | 4/2013 | Thompson et al. |
| 2013/0116376 A1 | 5/2013 | Custodero |
| 2013/0267640 A1* | 10/2013 | Lopez ............... B60C 1/0016 524/322 |
| 2013/0274404 A1 | 10/2013 | Vasseur |
| 2013/0338256 A1 | 12/2013 | Steiner et al. |
| 2014/0024745 A1 | 1/2014 | Vasseur |
| 2014/0135437 A1 | 5/2014 | Sandstrom et al. |
| 2014/0171557 A1 | 6/2014 | Ringot |

\* cited by examiner

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

SUMMARY OF THE INVENTION

The present invention is directed to a pneumatic tire having a tread comprising a vulcanizable rubber composition comprising, based on 100 parts by weight of elastomer (phr), (A) from about 60 to about 100 phr of a solution polymerized styrene-butadiene rubber having more than 98 percent of the repeat units derived from styrene in blocks containing less than five repeat units, Tg ranging from −65° C. to −79° C.;

(B) up to 40 phr of polybutadiene having a cis 1,4 content greater than 95 percent and a Tg ranging from −80 to −110° C.;

(C) from 30 to 80 phr of a combination of a resin having a Tg of at least 30° C. and an oil, wherein the weight ratio of resin to oil is greater than 1.

DESCRIPTION OF THE INVENTION

There is disclosed to a pneumatic tire having a tread comprising a vulcanizable rubber composition comprising, based on 100 parts by weight of elastomer (phr), (A) from about 60 to about 100 phr of a solution polymerized styrene-butadiene rubber having more than 98 percent of the repeat units derived from styrene in blocks containing less than five repeat units, Tg ranging from −65° C. to −79° C.;

(B) up to 40 phr of polybutadiene having a cis 1,4 content greater than 95 percent and a Tg ranging from −80 to −110° C.;

(C) from 30 to 80 phr of a combination of a resin having a Tg of at least 30° C. and an oil, wherein the weight ratio of resin to oil is greater than 1.

The rubber composition includes from 60 to 100 phr of a solution polymerized styrene-butadiene rubber having more than 98 percent of the repeat units derived from styrene in blocks containing less than five repeat units, Tg ranging from −65 C to −79° C.

The styrene-butadiene rubber is comprised of repeat units which are derived from 1,3-butadiene and styrene. These styrene-butadiene rubbers will contain from about 15 weight percent to about 25 weight percent of units derived from styrene and from about 75 weight percent to about 85 weight percent of units derived from 1,3-butadiene. By "units derived from" it is meant the monomer residues existing in the polymer after polymerization of the styrene and 1,3-butadiene monomers.

In the styrene-butadiene rubber, the distribution of repeat units derived from styrene and butadiene is essentially random. The term "random" as used herein means that less than 5 percent of the total quantity of repeat units derived from styrene are in blocks containing five or more styrene repeat units. In other words, more than 95 percent of the repeat units derived from styrene are in blocks containing less than five repeat units. A large quantity of repeat units derived from styrene will be in blocks containing only one styrene repeat unit. Such blocks containing one styrene repeat unit are bound on both sides by repeat units which are derived from 1,3-butadiene.

In the styrene-butadiene rubber, less than 2 percent of the total quantity of repeat units derived from styrene are in blocks containing five or more styrene repeat units. In other words, more than 98 percent of the repeat units derived from styrene are in blocks containing less than five repeat units. In one embodiment, less than 1 percent of the total quantity of repeat units derived from styrene are in blocks containing five or more styrene repeat units. In one embodiment, less than 0.5 percent of the total quantity of repeat units derived from styrene are in blocks containing five or more styrene repeat units. In such styrene-butadiene rubbers, over 40 percent of repeat units derived from styrene will be in blocks containing only one styrene repeat unit, over 75 percent of the repeat units derived from styrene will be in blocks containing less than 3 repeat units and over 95 percent of the repeat units derived from styrene will be in blocks containing less than 4 repeat units. Normally less than 2 percent of the bound styrene in the styrene-butadiene rubber is in blocks of greater than 3 repeat units. Preferably less than 1 percent of the bound styrene in the styrene-butadiene rubber is in blocks of greater than 3 repeat units.

The styrene-butadiene copolymers of this invention also have a consistent composition throughout their polymer chains. In other words, the styrene content of the polymer will be the same from the beginning to the end of the polymer chain. No segments of at least 100 repeat units within the polymer will have a styrene content which differs from the total styrene content of the polymer by more than 10 percent. Such styrene-butadiene copolymers will typically contain no segments having a length of at least 100 repeat units which have a styrene content which differs from the total styrene content of the polymer by more than about 5 percent.

Characterization of the styrene repeat units in the styrene-butadiene rubber (also referred to as "styrene block length" or "styrene sequence") may be done using ozonolysis following the procedures of Tanaka, et al., Rubber Chem. Technol. 1986, vol 59, p 16. as follows. The heterogeneity characterization of the styrene-butadiene polymer is achieved using chemical degradation. This is realized by ozonolysis of the dried polymer, followed by GC (gas chromatography) and GPC (gel permeation chromatography) analysis. In this procedure, a 0.5 grain sample of the rubber is dissolved in toluene and cooled to 10° C. and subjected to atmosphere of ozone generated from an ozonizer apparatus. The resulting solution is collected and subjected to GC column chromatography where each peak is isolated and characterized by GPC. The molecular weight of each peak is utilized to determine the number of styrene repeat units.

Suitable styrene-butadiene rubber may be produced following the procedures disclosed in U.S. Pat. No. 6,372,863, fully incorporated herein by reference.

The solution polymerized styrene-butadiene rubber has a glass transition temperature in a range from −65° C. to −79° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

Another component of the rubber composition is up to 40 phr of polybutadiene having a cis 1,4 content greater than 95 percent and a Tg ranging from −80 to −110° C. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from about −95° C. to about −105° C. Suitable polybutadiene rubbers are available commercially, such as Budene® 1229 from Goodyear and the like, having a Tg of −108° C. and cis 1,4, content of 96%. The rubber composition includes a combination of processing oil and resin in an amount ranging from 30 to 80 phr. In one embodiment, the rubber composition includes a combination of processing oil and resin in an amount ranging from 30 to 50 phr. In one embodiment, the rubber composition includes a combination of processing oil and resin in an amount ranging from 50 to 80 phr.

In one embodiment, the rubber composition includes from 5 to 25 phr of processing oil, and 25 to 45 phr of resin. In one embodiment, the rubber composition includes from 5 to 15 phr of processing oil, and 45 to 70 phr of resin.

In one embodiment, the weight ratio of resin to oil is greater than 1. In one embodiment, the weight ratio of resin to oil is greater than 3. In one embodiment, the weight ratio of resin to oil is greater than 6.

The rubber composition includes a processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, and vegetable oils such as sunflower, soybean, and safflower oils.

In one embodiment, the rubber composition includes a low PCA oil. Suitable low PCA oils include but are not limited to mild extraction solvates (MES), treated distillate aromatic extracts (TDAE), and heavy naphthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy naphthenic oils generally have a Tg in a range of from about −42° C. to about −48° C. A suitable measurement for Tg of TDAE oils is DSC according to ASTM E1356, or equivalent.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

Suitable TDAE oils are available as Tudalen SX500 from Klaus Dahleke K G, VivaTec 400 and VivaTec 500 from H&R Group, and Enerthene 1849 from BP, and Extensoil 1996 from Repsol. The oils may be available as the oil alone or along with an elastomer in the form of an extended elastomer.

Suitable vegetable oils include, for example, soybean oil, sunflower oil and canola oil which are in the form of esters containing a certain degree of unsaturation.

The rubber composition includes a resin having a Tg greater than 20° C. A suitable measurement of Tg for resins is DSC according to ASTM D6604 or equivalent. The resin has a softening point above 70° C. as determined by ASTM E28 which might sometimes be referred to as a ring and ball softening point.

The resin is selected from the group consisting of coumarone-indene resin, petroleum hydrocarbon resin, terpene polymers, styrene-alphamethylstyrene resins, terpene phenol resin, rosin derived resins and copolymers and/or mixtures thereof.

In one embodiment, the resin is a coumarone-indene resin containing coumarone and indene as the monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cycopentadiene, and diolefins such as isoprene and piperlyene.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefines containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above. In one embodiment, said resin may be a terpene resin comprised of polymers of at least one of limonene, alpha pinene, beta pinene and delta-3-carene.

Terpene-phenol resins may be used. Terpene-phenol resins may be derived by copolymerization of phenolic monomers with terpenes such as limonenes, pinenes and delta-3-carene.

In one embodiment, the resin is a resin derived from rosin and derivatives. Representative thereof are, for example, gum rosin, wood rosin and tall oil rosin. Gum rosin, wood rosin and tall oil rosin have similar compositions, although the amount of components of the rosins may vary. Such resins may be dimerized, polymerized or disproportionated. Such resins may be in the form of esters of rosin acids and polyols such as pentaerythritol or glycol.

In one embodiment, said resin may be partially or fully hydrogenated.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 100 to about 180 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP and Z165GR and silicas available from Degussa AG with, for example, designations VN2 and VN3, etc.

The vulcanizable rubber composition may include from about 5 to about 50 phr of carbon black.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

The vulcanizable rubber composition may include both silica and carbon black in a combined concentration of from about 100 to about 180 phr, the majority of which is preferably silica.

Other fillers may be used in the rubber composition including, but not limited to, particulate fillers including ultra high molecular weight polyethylene (UHMWPE), particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639.

It may be preferred to have the rubber composition for use in the tire component to additionally contain a conventional sulfur containing organosilicon compound. Examples of suitable sulfur containing organosilicon compounds are of the formula:

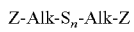

in which Z is selected from the group consisting of

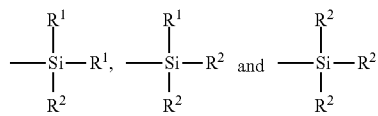

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore, as to formula I, preferably Z is

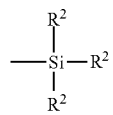

where $R^2$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S[3-(triethoxysilyl)propyl] thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 3, phr. In another embodiment, combinations of a primary and a secondary accelerator might be used with the secondary accelerator being used in smaller amounts, such as from about 0.05 to about 4 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a tread of a tire.

The pneumatic tire of the present invention may be a race tire, passenger tire, aircraft tire, agricultural, earthmover, off-the-road, truck tire, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

Example I

This example illustrates the advantage of a rubber composition according to the invention. Rubber compounds were mixed according to the formulations shown in Table 1, with amounts given in phr. The compounds were cured and tested for physical properties as shown in Table 2.

Control Sample C1 is made from functionalized solution-SBR of Tg −60° C. that has less than 2 percent of the total quantity of repeat units derived from styrene in blocks containing five or more styrene repeat units while the control Sample C2 is made from a non-functionalized solution-SBR of Tg −78° C. having about 2.9 (more than 2) percent of the total quantity of repeat units derived from styrene in blocks containing five or more styrene repeat units. The control Sample C2 demonstrates worse predicted snow performance based on a higher storage modulus at −20° C. (38.6 MPa) compared to control Sample C1 (21.8 MPa) while showing equal predicted wet grip performance based on same tan D values at 0° C. (0.49) compared to the control Sample C1.

The inventive Sample E1 is made from 90 phr of a non-functionalized solution-SBR of Tg −78° C. having less than 2 percent of the total quantity of repeat units derived from styrene in blocks containing five or more styrene repeat units. It is clearly seen that the predicted snow performance is significantly improved over control Sample C2 from 38.6 MPA to 21.8 MPa while the predicted wet grip performance is minimally impacted being reduced from 0.49 to 0.48.

The inventive Sample E2 is made from 100 phr of non-functionalized solution-SBR of Tg −78° C. having less than 2 percent of the total quantity of repeat units derived from styrene in blocks containing five or more styrene repeat units. The predicted snow performance is further improved based on the decrease of storage modulus at −20° C. from 21.8 MPa to 18.9 MPa. The results also show suggesting better predicted wet performance based on tan D at 0° C. of 0.52 compared to the control value of 0.49.

Further, it is observed that inventive Samples E1 and E2 yielded similar DIN abrasion loss values and similar tan D values at 100° C. which is predictive of maintaining a beneficially similar tire treadwear and rolling resistance for a tire tread of these rubber compositions.

It is thereby concluded from inventive Samples E1 and E2 of this evaluation that a unique discovery was obtained of a sulfur cured rubber composition composed of non-functionalized low Tg styrene/butadiene rubber having less than 2 percent of the total quantity of repeat units derived from styrene in blocks containing five or more styrene repeat units.

TABLE 1

| | Sample No. | | | |
|---|---|---|---|---|
| | C1 | C2 | E1 | E2 |
| s-SBR [1] | 75 | 0 | 0 | 0 |
| s-SBR [2] | 0 | 90 | 0 | 0 |
| s-SBR [3] | 0 | 0 | 90 | 100 |
| cis-BR [4] | 25 | 10 | 10 | 0 |
| Traction resin [5] | 36 | 36 | 36 | 36 |
| TDAE oil | 26 | 26 | 26 | 26 |
| Antioxidants | 5 | 5 | 5 | 5 |
| Stearic acid | 5 | 5 | 5 | 5 |
| Silane [6] | 8.8 | 8.8 | 8.8 | 8.8 |
| Silica [7] | 140 | 140 | 140 | 140 |
| ZnO | 2.5 | 2.5 | 2.5 | 2.5 |
| Sulfur | 1.2 | 1.2 | 1.2 | 1.2 |
| Accelerators | 6.5 | 6.5 | 6.5 | 6.5 |

[1] Solution polymerized SBR with styrene content of 15% and 1,2-vinyl content of 30%, Tg = −60° C. obtained from Styron as SLR3402.
[2] Solution polymerized SBR with styrene content of 18% and 1,2-vinyl content of 10%, Tg = −78° C., having about 2.9 percent of the total quantity of repeat units derived from styrene in blocks containing five or more styrene repeat units, obtained as SLF18B10 from The Goodyear Tire & Rubber Company.
[3] Solution polymerized SBR with styrene content of 19% and 1,2-vinyl content of 9%, Tg = −77° C., having less than 2 percent of the total quantity of repeat units derived from styrene in blocks containing five or more styrene repeat units.
[4] High cis polybutadiene, obtained as Budene 1229 from The Goodyear Tire & Rubber Company.
[5] Copolymer of styrene and alpha-methylstyrene, Tg .= +39° C., obtained as Sylvares SA85 from Arizona Chemicals.
[6] TESPD type silane coupling agent.
[7] Hi-Sil 315G-D precipitated silica from PPG with a CTAB surface area of 125 $m^2/g$.

TABLE 2

| | Sample No. | | | |
|---|---|---|---|---|
| | C1 | C2 | E1 | E2 |
| Tensile Properties [1] | | | | |
| Elongation (%) | 580 | 589 | 605 | 571 |
| Modulus 100% (MPa) | 1.4 | 1.4 | 1.5 | 1.6 |
| Modulus 300% (MPa) | 6.1 | 5.1 | 5.9 | 6.9 |
| Tensile Strength (MPa) | 14.9 | 12.6 | 14.9 | 15.4 |
| RPA instrument [2] | | | | |
| G' (100° C.) (MPa) | 2.7 | 3.4 | 3.2 | 2.9 |
| TanD (100° C.) | 0.17 | 0.23 | 0.19 | 0.19 |
| Metravib instrument [3] | | | | |
| G' (−20° C.) (MPa) | 21.8 | 38.6 | 21.8 | 18.9 |
| TanD (0° C.) | 0.49 | 0.49 | 0.48 | 0.52 |
| Wear Properties [4] | | | | |
| Abrasion-DIN ($mm^3$) | 127 | 136 | 131 | 130 |

[1] Data according to Automated Testing System instrument by the Instron Corporation. Such instrument may determine ultimate tensile, ultimate elongation, modulii, etc. Data reported in the Table is generated by running the ring tensile test station which is an Instron 4201 load frame.
[2] Measured at 2% strain, frequency 0.33/3.33 Hz, 100 C. Data according to Rubber Process Analyzer as RPA 2000. TM. instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, Apr. 26 and May 10, 1993.
[3] The G' modulus and tanD at low temperatures can be readily be determined by a Metravib TM instrument at 1.5 percent strain and 7.8 Hertz. The test method is understood to be similar to ISO 4664 and DIN 53513.
[4] Data according to DIN 53516 abrasion resistance test procedure using a Zwick drum abrasion unit, model 6102 with 2.5 Newtons force. DIN standards are German test standards. The DIN abrasion results are reported as relative values to a control rubber composition used by the laboratory.

While certain representative embodiments and details have been shown for the purpose of illustrating the subject invention, it will be apparent to those skilled in this art that various changes and modifications can be made therein without departing from the scope of the subject invention.

What is claimed is:
1. A pneumatic tire having a tread comprising a vulcanizable rubber composition comprising, based on 100 parts by weight of elastomer (phr),
   (A) from about 60 to about 90 phr of a non-functionalized solution polymerized styrene-butadiene rubber having from about 15 to about 25 percent by weight of units derived from styrene and having more than 98 percent of the repeat units derived from styrene in blocks containing less than five repeat units, Tg ranging from −65° C. to −79° C.;

(B) from 10 to 40 phr of polybutadiene having a cis 1,4 content greater than 95 percent and a Tg ranging from −80 to −110° C.;

(C) from 36 to 45 phr of a resin having a Tg of at least 30° C. and from 5 to 25 phr of an oil selected from the group consisting of MES oils, TDAE oils, and vegetable oils, wherein the weight ratio of resin to oil is greater than 1, wherein the resin is derived from styrene and alphamethylstyrene;

wherein the composition comprises no elastomer other than the non-functionalized solution polymerized styrene-butadiene rubber and the polybutadiene.

2. The pneumatic tire of claim 1, wherein the weight ratio of resin to oil is greater than 3.

3. The pneumatic tire of claim 1, wherein the weight ratio of resin to oil is greater than 6.

4. The pneumatic tire of claim 1, wherein the solution polymerized styrenebutadiene rubber has more than 99 percent of the repeat units derived from styrene in blocks containing less than five repeat units.

5. The pneumatic tire of claim 1, wherein the solution polymerized styrenebutadiene rubber has more than 99.5 percent of the repeat units derived from styrene in blocks containing less than five repeat units.

6. The pneumatic tire of claim 1, wherein said vulcanizable rubber composition comprises about 100 to about 180 phr of silica.

7. The pneumatic tire of claim 1, wherein the oil is a TDAE oil.

8. The pneumatic tire of claim 7, wherein the composition comprises no oil other than the TDAE oil.

9. The pneumatic tire of claim 1, wherein the composition comprises no oil other than the TDAE oil, the MES oil, or the vegetable oil.

* * * * *